United States Patent
Brown et al.

(10) Patent No.: US 10,632,436 B2
(45) Date of Patent: Apr. 28, 2020

(54) HYDROGEN, LITHIUM, AND LITHIUM HYDRIDE PRODUCTION

(71) Applicant: Consolidated Nuclear Security, LLC, Oak Ridge, TN (US)

(72) Inventors: Sam W. Brown, Knoxville, TN (US); Larry S. Spencer, Knoxville, TN (US); Michael R. Phillips, Harriman, TN (US); G. Louis Powell, Oak Ridge, TN (US); Peggy J. Campbell, Clinton, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 331 days.

(21) Appl. No.: 15/592,289

(22) Filed: May 11, 2017

(65) Prior Publication Data

US 2017/0239633 A1    Aug. 24, 2017

Related U.S. Application Data

(63) Continuation-in-part of application No. 14/171,801, filed on Feb. 4, 2014, now Pat. No. 9,682,859, which
(Continued)

(51) Int. Cl.
| | | |
|---|---|---|
| *C22B 1/00* | (2006.01) | |
| *C22B 19/16* | (2006.01) | |
| *C22B 5/16* | (2006.01) | |
| *C22B 26/22* | (2006.01) | |
| *C22B 17/06* | (2006.01) | |
| *B01J 7/00* | (2006.01) | |
| *C01B 3/04* | (2006.01) | |
| *B01D 53/00* | (2006.01) | |
| *C22B 26/12* | (2006.01) | |
| *C22B 9/00* | (2006.01) | |
| *C22B 9/02* | (2006.01) | |
| *C22B 9/04* | (2006.01) | |
| *F27D 7/06* | (2006.01) | |

(Continued)

(52) U.S. Cl.
CPC .............. *B01J 7/00* (2013.01); *B01D 53/002* (2013.01); *B01D 53/22* (2013.01); *C01B 3/04* (2013.01); *C01D 15/00* (2013.01); *C22B 9/006* (2013.01); *C22B 9/026* (2013.01); *C22B 9/04* (2013.01); *C22B 26/12* (2013.01); *F27D 7/06* (2013.01); *F27D 17/001* (2013.01); *F27D 17/008* (2013.01); *F27D 2007/066* (2013.01); *Y02E 60/364* (2013.01)

(58) Field of Classification Search
None
See application file for complete search history.

(56) References Cited

U.S. PATENT DOCUMENTS 2,007,332 A *  7/1935 Friedrich ................ C22B 19/16
  266/145
6,814,779 B2 * 11/2004 Tayama ..................... C22B 9/02
  423/508

* cited by examiner

*Primary Examiner* — Xiaowei Su
(74) *Attorney, Agent, or Firm* — Luedeka Neely Group, P.C.; Michael J. Renner, Esq.

(57) ABSTRACT

A hydrogen, lithium, and lithium hydride processing apparatus includes a hot zone to heat solid-phase lithium hydride to form liquid-phase lithium hydride; a vacuum source to extract hydrogen and gaseous-phase lithium metal from the liquid-phase lithium hydride; a cold zone to condense the gaseous-phase lithium metal as purified solid-phase lithium metal; and a heater to melt the purified solid-phase lithium metal in the cold zone and form refined liquid-phase lithium metal in the hot zone.

22 Claims, 4 Drawing Sheets

Related U.S. Application Data is a continuation of application No. 13/222,002, filed on Aug. 31, 2011, now Pat. No. 8,679,224.

(51) Int. Cl.
*F27D 17/00* (2006.01)
*C01D 15/00* (2006.01)
*B01D 53/22* (2006.01)

HYDROGEN, LITHIUM, AND LITHIUM HYDRIDE PRODUCTION

CROSS REFERENCE TO RELATED APPLICATION

This application is a continuation-in-part of co-pending U.S. patent application Ser. No. 14/171,801, filed on Feb. 4, 2014, entitled "Hydrogen, Lithium, and Lithium Hydride Production," which was a continuation of U.S. patent application Ser. No. 13/222,002, filed Aug. 31, 2011, entitled "Hydrogen, Lithium, and Lithium Hydride Production," which was granted as U.S. Pat. No. 8,679,224, the entire contents of each being incorporated by reference herein.

GOVERNMENT RIGHTS

The U.S. Government has rights to this invention pursuant to contract number DE-NA0001942 between the U.S. Department of Energy and Consolidated Nuclear Security, LLC.

FIELD

This disclosure relates to the field of material processing. More particularly, this disclosure relates to hydrogen, lithium and lithium hydride production.

BACKGROUND

Lithium hydride (LiH) is a useful material. It reacts with water to produce hydrogen gas and lithium hydroxide. Although this is a violent reaction, it was used in World War II to provide a lightweight source of hydrogen to inflate signaling balloons. In addition to various applications that require the production of hydrogen, there are many applications that require high purity lithium and many applications that require the production of high purity lithium hydride. Standard methods for production of high purity lithium and high purity lithium hydride are generally expensive. What are needed therefore are safer and more economical means for using lithium hydride to produce hydrogen, and better means for producing high purity lithium and high purity lithium hydride.

SUMMARY

The present disclosure provides various embodiments of hydrogen, lithium, and lithium hydride processing apparatuses. Typically these apparatuses have a hot zone to heat solid-phase lithium hydride to form liquid-phase lithium hydride. A vacuum source is typically provided to extract hydrogen and gaseous-phase lithium metal from the liquid-phase lithium hydride. Embodiments of the apparatuses also typically have a cold zone to condense the gaseous-phase lithium metal as purified solid-phase lithium metal. A heater is typically provided to melt the purified lithium metal in the cold zone and form refined liquid-phase lithium in the hot zone. A moderate zone may be provided and is typically disposed between the hot zone and the cold zone to capture a lithium condensate portion of the gaseous-phase lithium and to return the lithium condensate portion to the hot zone as liquid-phase lithium condensate.

The present disclosure further provides methods of producing hydrogen. The methods typically employ a step "a" of heating lithium hydride to form liquid-phase lithium hydride, a step "b" of extracting hydrogen from the liquid-phase lithium hydride, leaving residual liquid-phase lithium metal, and a step "c" of hydriding the liquid-phase lithium metal. The methods typically involve repeating steps "a" and "b" at least once.

The present disclosure also provides methods of processing hydrogen and lithium material. Methods typically include steps of heating a lithium hydride source material that includes lithium hydride to form liquid-phase lithium hydride. The methods generally also involve reducing an ambient pressure over the liquid-phase lithium hydride. Typically, a further step involves extracting hydrogen and gaseous-phase lithium metal from the liquid-phase lithium hydride. Generally the methods also involve condensing the gaseous-phase lithium metal as solid-phase lithium metal. Then the solid-phase lithium metal may be melted to form refined liquid-phase lithium metal. Some methods may include hydriding the refined liquid-phase lithium metal.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

In the following detailed description of the preferred and other embodiments, reference is made to the accompanying drawings, which form a part hereof, and within which are shown by way of illustration the practice of specific embodiments of hydrogen and lithium material processing apparatuses and embodiments of methods of processing hydrogen and lithium material. It is to be understood that other embodiments may be utilized, and that structural changes may be made and processes may vary in other embodiments.

Lithium hydride is a very space-efficient material for the storage of hydrogen. The hydrogen density in lithium hydride is greater than the density of metallic (solid) hydrogen. In other words there is more hydrogen stored in a cubic unit measure of lithium hydride than in the same cubic unit measure of pure metallic hydrogen. This phenomenon provides a potential for the use of lithium hydride as a means of compact storage of hydrogen for use in hydrogen-powered vehicles and other applications where a source of hydrogen on demand is needed.

At atmospheric pressure lithium hydride melts at about 692° C. By reducing the ambient pressure to near vacuum conditions, lithium hydride may be melted at about 680° C. At atmospheric pressure liquid lithium hydride decomposes into lithium metal and hydrogen gas at about 850° C. The temperature at which the decomposition occurs may be lowered to about 750° C. by reducing the ambient pressure over the liquid lithium hydride to near vacuum conditions. These characteristics may be used in thermal processes to generate hydrogen from lithium hydride with relative safety compared with a chemical reaction of water with lithium hydride. Such thermal processes have a further advantage of producing lithium metal instead of the lithium hydroxide that results from the chemical reaction of water with lithium hydride. Typically, many impurities in the lithium hydride are removed during these thermal processes such that a refined lithium metal is produced. In addition, such thermal processes may be extended to economically produce high purity lithium hydride by re-hydriding the refined lithium metal.

Figure 1:
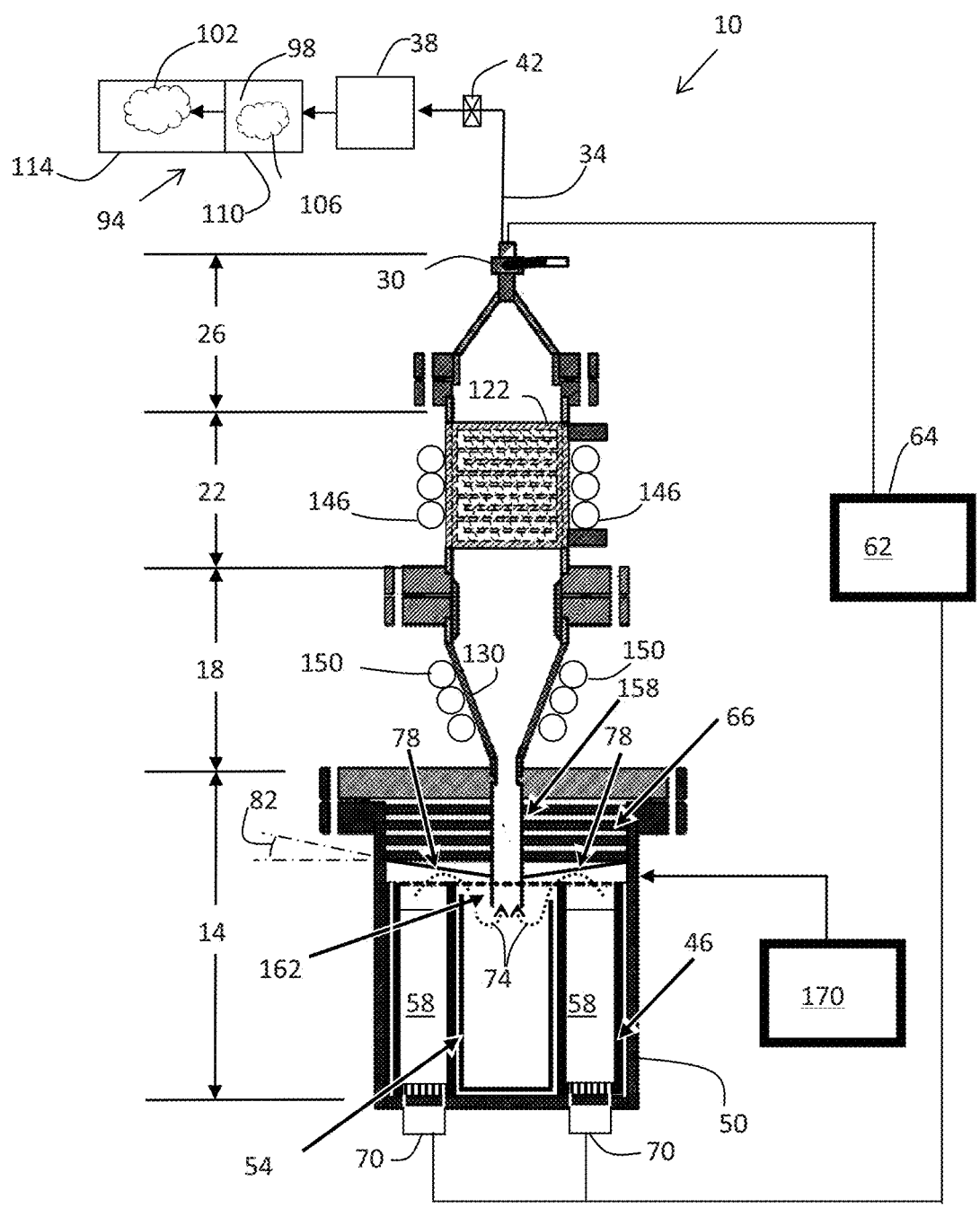
FIG. 1 is a somewhat schematic cross-sectional view of an apparatus for processing hydrogen and lithium materials according to one embodiment of the disclosure.

FIG. 1 illustrates an apparatus 10 that may be used to generate hydrogen and lithium metal, as well as to produce high purity lithium and high purity lithium hydride. The apparatus 10 may also be used to store hydrogen and release the stored hydrogen for subsequent use. The apparatus 10 provides a hot zone 14, a moderate zone 18, a cold zone 22, and an extraction zone 26. The apparatus 10 also includes a vacuum system 38 that is connected by an extraction line 34 to the top of the extraction zone 26 through a manifold 30. Typically the vacuum system 38 is an oil-free vacuum pump. A valve 42 is typically provided in the extraction line 34 to permit sealing off the vacuum system 38 from the extraction zone 26.

In the embodiment of the apparatus 10 depicted in FIG. 1 the hot zone 14 includes a shim pot 46 that is disposed within a process vessel 50. A "shim pot" is a double-walled vessel with a space between the walls for containing materials. In the embodiment of FIG. 1, a lithium hydride source material 58 is disposed between the walls of the shim pot 46. In the embodiment of apparatus 10 depicted in FIG. 1, a center can 54 is disposed within the open space formed by the inner wall of the shim pot 46. The shim pot 46 and the center can 54 are preferably constructed from a material such as iron that is compatible with lithium. In some embodiments, the shim pot 46 is not used and the lithium hydride source material 58 is disposed between the process vessel 50 and the center can 54. In such embodiments the process vessel 50 is preferably constructed from a material such as iron that is compatible with lithium. In embodiments where a shim pot is used (such as shim pot 46) the process vessel 50 may be constructed from stainless steel, which could be susceptible to erosion if contacted with hot lithium were it not for the protection against such erosion that is provided by the shim pot 46. Typically the shim pot 46, the process vessel 50 and the center can 54 are concentric circular annular shapes.

The lithium hydride source material 58 is substantially lithium hydride, but the lithium hydride source material 58 may include up to ten percent impurities. That is, the lithium hydride content may be in a range from about ninety to one hundred percent of the lithium hydride source material 58.

Typically the operation of the apparatus 10 begins with establishing a flow of purge gas such as argon 62 from a tank 64 through the manifold 30. Then the vacuum system 38 is activated with the valve 42 open. The purge flow tends to reduce the flow of dust from the lithium hydride source material 58 into the vacuum system 38. The process vessel 50 and the shim pot 46 (if used) and the center can 54 are then heated with an appropriate energy source (e.g., electric resistance, induction, natural gas). The hot zone 14 is kept under dynamic vacuum by the vacuum system 38 as the temperature is increased. The term "dynamic vacuum" means that the hot zone 14 is being actively pumped by the vacuum system 38 (i.e., it is not just pumped to vacuum and then valved off, leaving a trapped vacuum condition). This active pumping removes the argon 62 and any off-gasses from the lithium hydride source material 58. Heating continues until the lithium hydride source material reaches at least 680° C., which is a melting temperature of lithium hydride at reduced atmosphere. Radiation baffles 66 are provided in the embodiment of FIG. 1 to reduce the heat loss through the top of the hot zone 14. Even so, when the bottom of the hot zone 14 is at 680° C. the top of the hot zone 14 may only reach 400° C. This is acceptable. Once the lithium hydride source material 58 is melted the flow of purge gas 62 (e.g., argon through the manifold 30) may be discontinued.

As this process proceeds, a barrier crust may form above the liquid-phase lithium hydride in the shim pot 46 (or in the process vessel 50 if the shim pot 46 is not used). The barrier crust is a slag-like material that may be formed from impurities in the lithium hydride, and from lithium hydroxide formed from lithium hydride reacting with trace amounts of water vapor in the apparatus 10, and/or from other contaminants. The barrier crust slows down the evolution of hydrogen from the liquid-phase lithium hydride. To overcome this, FIG. 1 illustrates that the apparatus 10 may include an agitator 70 for retarding the formation of the barrier crust. In some embodiments the agitator 70 may comprise an inert gas sparge, such as a gas sparge using a flow of the argon 62 that was discontinued as a purge gas when the lithium hydride source material 58 melted. Such a sparge flow substantially retards the formation of the barrier crust above the molten phase. In some embodiments the agitator 70 may comprise an energy source having a periodic waveform (such as ultrasonic vibration) that is applied to the bottom of the shim pot 46 to retard the development of a barrier crust. In embodiments that do not employ the shim pot 46, the agitator 70 is applied at the bottom of the process vessel 50 between the process vessel 50 and the center can 54.

Figure 2:
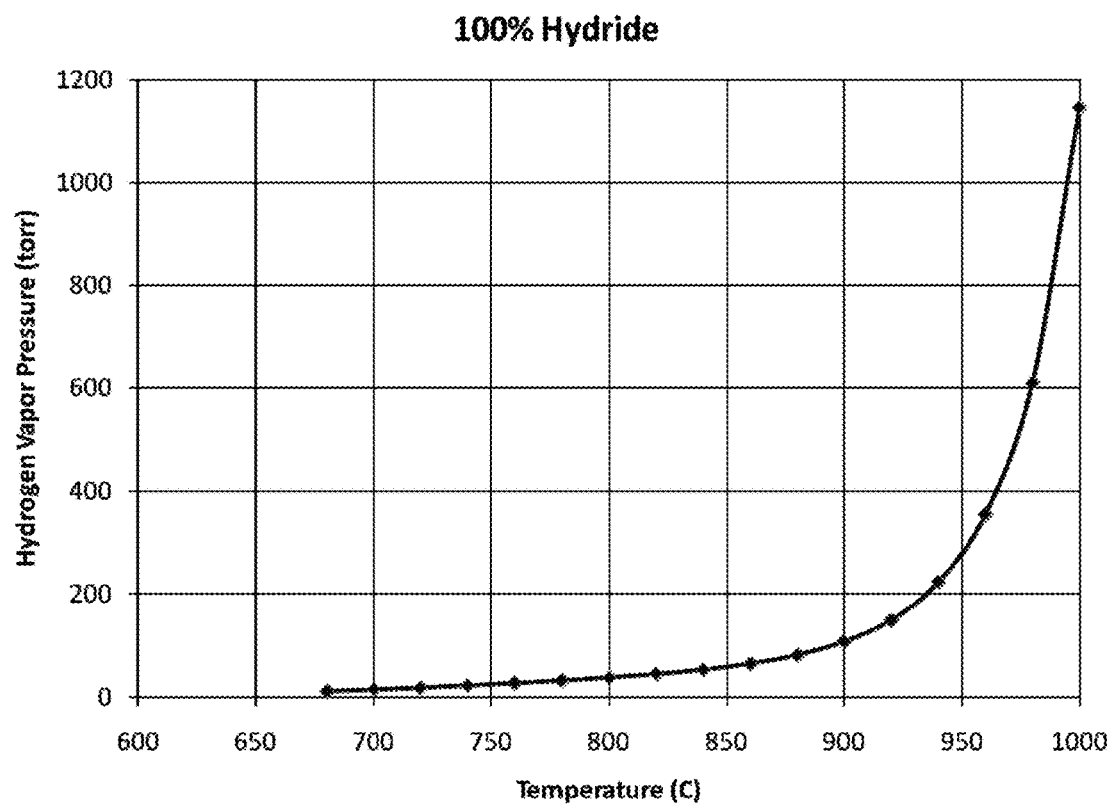
FIG. 2 is a vapor pressure curve for hydrogen in lithium hydride as a function of temperature.
Figure 3:
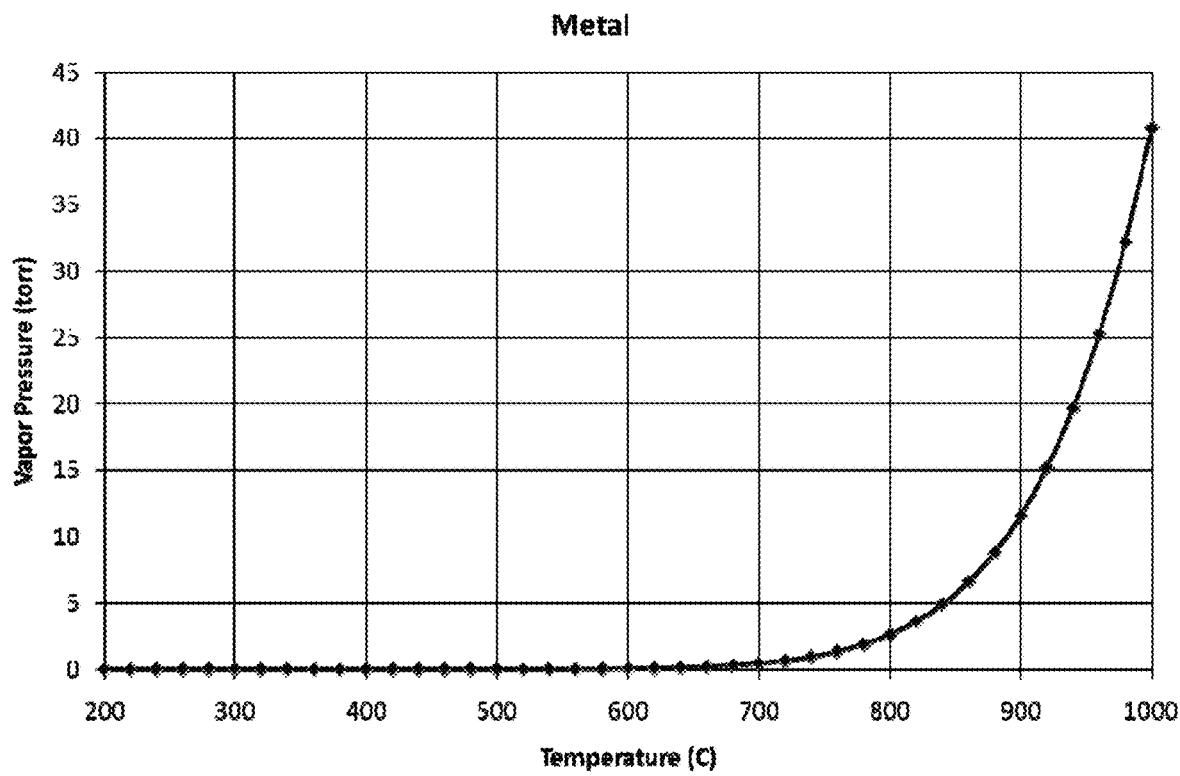
FIG. 3 is a vapor pressure curve for lithium metal as a function of temperature.

After the lithium hydride source material 58 melts, the process vessel 50 and the shim pot 46 (if used) and the center can 54 are further heated such that the lithium hydride source material 58 reaches a temperature of at least 750° C. At that temperature, under near vacuum conditions, the molten lithium hydride decomposes into liquid-phase lithium metal and gaseous-phase hydrogen. FIGS. 2 and 3 illustrate the comparative vapor pressures of hydrogen in molten lithium hydride versus the vapor pressure of lithium metal. At any temperature in the range of 700° C. to 1000° C. the vapor pressure of hydrogen from lithium hydride is ten to thirty times higher than the vapor pressure of lithium vapor from lithium metal. Lithium hydride decomposes when the vapor pressure of the hydrogen content is above about 30 torr. This occurs at about 750° C., and at that temperature the vapor pressure of Li from lithium metal is about 1 torr. Consequently, at 750° C., hydrogen is preferentially (almost exclusively) generated, with very little lithium vapor generated. Typically at 750° C., hydrogen generation occurs as fast as it can be pumped until all of the lithium hydride in the lithium hydride source material 58 has decomposed to lithium metal and hydrogen.

As the lithium hydride decomposes into hydrogen and lithium metal, the vacuum system 38 pulls the gaseous-phase hydrogen along paths 74 through the moderate zone 18. In embodiments where an inert gas sparge is employed, the vacuum system 38 also pulls the inert sparge gas through the moderate zone 18 and the cold zone 22.

The hydrogen (and inert sparge gas, if present) flows out of the vacuum system 38 into an accumulator 94. Certain impurities may also be pulled into the accumulator 94. A hydrogen membrane filter 98 (such as a side stream palladium filter) may be used to extract hydrogen 102 (which is substantially pure after filtration) and store it in a hydrogen storage compartment 114. The hydrogen 102 may be piped out of the hydrogen storage compartment 114 for use in a fuel cell process or for use in other devices or chemical processes. If an inert gas sparge 62 (such as the argon) is used, recovered inert gas 106 may be temporarily stored in an inert gas storage compartment 110. The recovered inert gas 106 may then be returned to the tank 64 and reused.

The just-concluded description of extraction of hydrogen from the lithium hydride source material completes the process application steps needed for some embodiments. In such embodiments the apparatus 10 may be reused for multiple repetitive operations by re-hydriding the lithium that remains in the hot zone 14. To do this, the hot zone 14 with the refined lithium metal in the process vessel 50 is heated to a temperature of about 800° C. (if it is not already at that temperature). Then hydrogen (at approximately 16 psia) is introduced into the hot zone 14 from a source of hydrogen 170, and the lithium metal is converted to lithium hydride. With this approach the apparatus 10 provides a reusable, high density hydrogen storage device. In such embodiments the apparatus 10 may be simplified by eliminating the shim pot 46 and eliminating elements described and discussed later herein such as the inclined deflector 78, the elements in the moderate zone 18, and the elements of the cold zone 22.

In some embodiments it is desirable to purify the liquid-phase lithium metal that remains in the process vessel 50 after extraction of the hydrogen from the lithium hydride. To do this, the process vessel 50 and the shim pot 46 (if used) and the center can 54 are further heated to about 900° C. to about 1,000° C. At that temperature the vacuum system 38 is able to extract gaseous-phase lithium metal from the liquid-phase lithium in the hot zone 14. An inclined deflector 78 may be provided to keep molten gaseous-phase lithium metal from weeping to the sides of the radiation baffles 66, and falling back into the space between the shim pot 46 and the center can 54. The deflector 78 is typically inclined at an angle 82 that is at least 12 degrees. In embodiments where the shim pot 46, the process vessel 50, and the center can 54 are annular, the deflector 78 is generally conical-shaped. The use of the sparge gas 62 (e.g., the argon) encourages the formation of lithium vapor, and, because the lithium vapor is relatively heavy, the sparge gas helps to float the lithium vapor up to the top and out of the liquid lithium where it is pulled by the vacuum system 38 into the cold zone 22. It has been found that higher sparge gas rates distill the lithium at a faster rate. Further, the larger the batch size of lithium hydride source material 58, the higher the sparge gas rate is needed to lift the relatively heavy lithium vapors to the cold zone 22. In preferred embodiments, the sparge gas rate ranges from about 10 L/min per kilogram of lithium metal to about 20 L/min per kilogram of lithium metal, and most preferably about 15 L/min per kilogram of lithium metal.

The cold zone 22 typically includes a chiller 122, such as a counter flow gas to gas heat exchanger. The gaseous-phase lithium metal pulled into the cold zone 22 solidifies as solid-phase lithium metal in the cold zone 22. Some of the gaseous-phase lithium metal vapors passing through the moderate zone 18 may condense back to liquid-phase lithium metal in the moderate zone 18 before reaching the cold zone 22. This condensed liquid-phase lithium metal (lithium metal condensate) flows by gravity back down through the funnel-shaped portion 130 of the moderate zone 18 and cylinder 158 in the lid of the process vessel 50 to the center can 54 in the hot zone 14. Upon its return to the process vessel 50 the condensed liquid-phase lithium metal may be again converted to gaseous-phase lithium metal. Eventually all gaseous-phase lithium metal vapors pass through the moderate zone 18 and condense in the cold zone 22 where the lithium metal is trapped in the solid phase.

Figure 4:
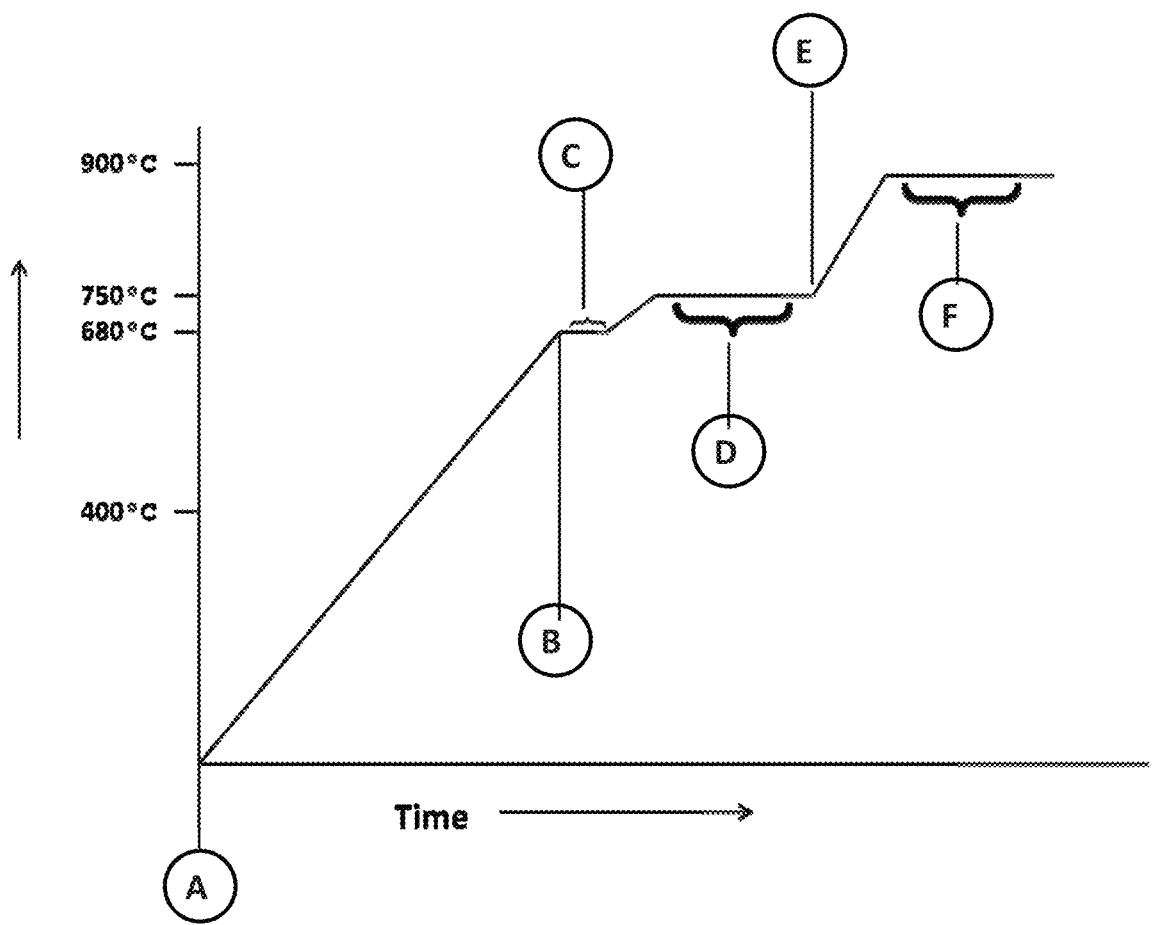
FIG. 4 is an exemplary temperature profile for extracting hydrogen from lithium hydride and purifying the resultant lithium.

FIG. 4 presents a summary of an exemplary temperature profile that may be used to extract hydrogen and lithium metal from the lithium hydride source material 58. The process starts at point "A" where the process vessel 50 is heated and argon 62 is introduced as a purge gas through the valve 42. When the lithium hydride source material 58 reaches a temperature of about 680° C. (at point "B") and is molten, the flow of argon 62 is switched to a sparge gas through the agitator 70. During the time interval "C" the lithium hydride becomes molten. The temperature of the molten lithium hydride is then increased to about 750° C. and during time interval "D" the lithium hydride decomposes to lithium and hydrogen, and the hydrogen is pumped away. When the lithium hydride decomposition is complete (at time "E") the molten lithium is further heated to about 900° C. where, during time interval "F," the lithium metal vaporizes and is frozen in the cold zone 22.

Upon completion of the thermal decomposition of lithium hydride and the deposit of the solid-phase lithium metal in the cold zone 22, the gas pressure in the device approaches full vacuum (provided that the inert gas sparge, if used, is turned off). At that point, the valve 42 to the vacuum system 38 may be closed and the apparatus 10 may be cooled, typically by simply turning off power to the apparatus 10.

Referring still to FIG. 1, the highly purified lithium metal that has condensed in the cold zone 22 may be extracted by using heaters 146 to heat the cold zone 22 to a temperature above 180° C., the melting temperature of lithium metal. Supplemental heaters 150 may be applied to the moderate zone 18. The purified liquid-phase lithium metal runs down into the center can 54 of the hot zone 14 (which is now cold) through a cylinder 158, thereby providing refined lithium metal. The cylinder 158 has an end 162, and it is beneficial to have the end 162 of the cylinder 158 terminate at an elevation that is below the top of the center can 54.

As previously noted, the apparatus 10 may be recharged for repetitive operations by re-hydriding the refined lithium in the hot zone 14 such that the refined lithium metal is converted to refined lithium hydride. Alternatively, the vapor distilled, ultra-high purity refined lithium metal may be removed from the process vessel 50 under inert conditions for other uses. In some embodiments the apparatus 10 is used as a reiterating lithium or lithium hydride refining device, and in such embodiments the source of hydrogen 170 may include hydrogen 102 extracted from a prior decomposition of lithium hydride.

Figure 5:
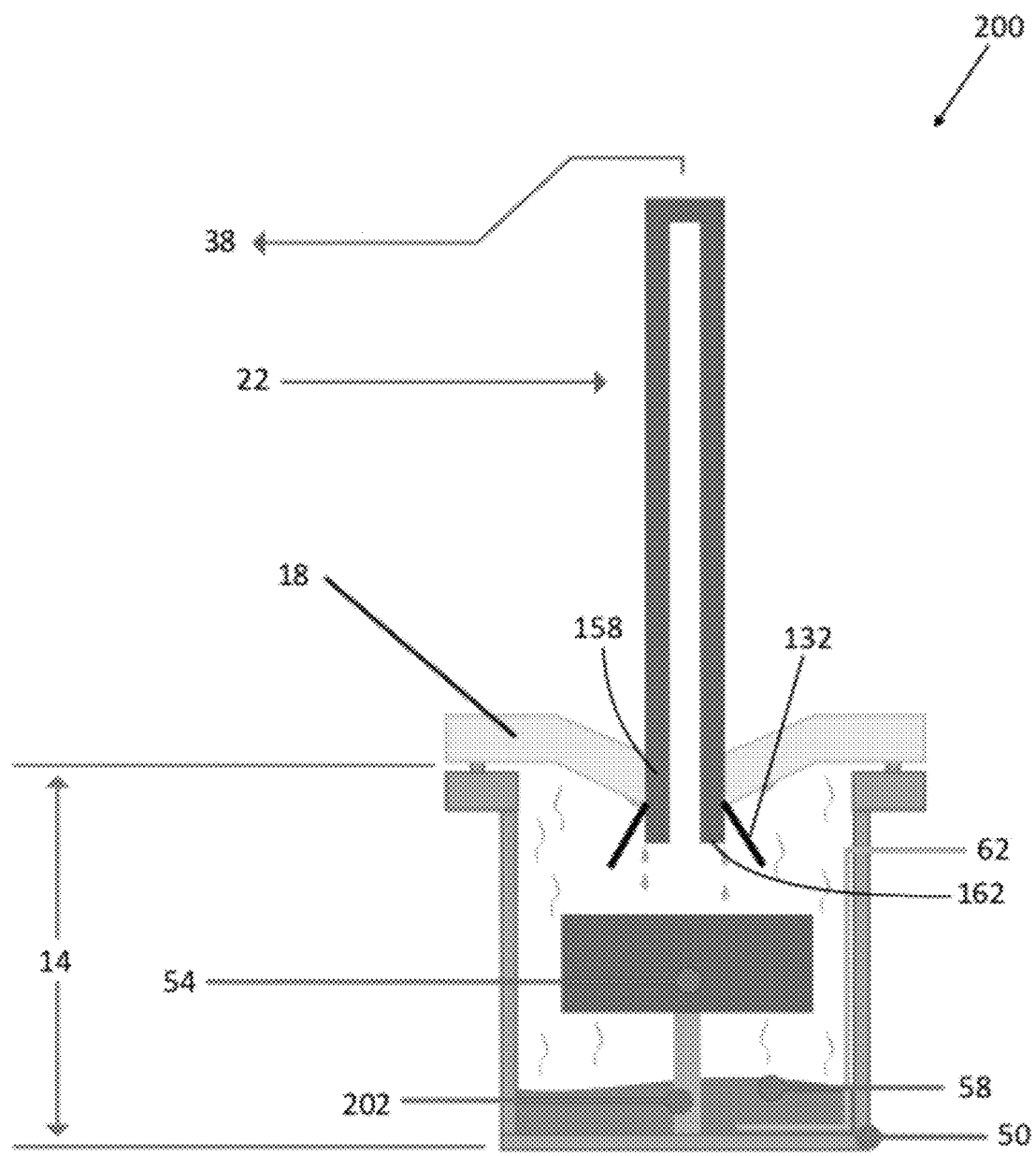
FIG. 5 is a somewhat schematic cross-sectional view of an apparatus for processing hydrogen and lithium materials according to another embodiment of the disclosure.

Referring to FIG. 5, apparatus 200 may be used to generate hydrogen and lithium metal according to an alternative embodiment. Apparatus 200 generally includes the same components described above, with corresponding components being given the same reference characters as identified in FIG. 1 for consistency. As shown, apparatus 200 also includes a hot zone 14, moderate zone 18, and a cold zone 22. A vacuum system 38 is provided to pull gaseous-phase hydrogen and subsequently lithium vapor through the system. A center can 54 is provided to collect condensed liquid-phase lithium metal that flows by gravity from the cold zone 22 and moderate zone 18 through cylinder 158. A sparge gas 62 is introduced into the process vessel 50 to encourage the formation of lithium vapor from the lithium hydride source material 58 and to help float the lithium vapor up to the moderate zone 18 and cold zone 22. A thermocouple well 202 is used to monitor the internal temperature profie of the process vessel 50.

One difference between apparatus 200 of FIG. 5 and apparatus 10 of FIG. 1 is that apparatus 200 integrates the moderate zone 18 with the lid of the process vessel 50. In preferred embodiments, the moderate zone 18 (i.e., lid of the process vessel) is in the form of a funnel to help direct the condensed liquid-phase lithium into the center can 54. Also, according to this alternative embodiment, the beginning of the cold zone 22 is disposed directly above the lid of the process vessel 50. In preferred embodiments, most of the condensing of the gaseous-phase lithium metal to liquid-phase lithium metal occurs in moderate zone 18. Any gaseous-phase lithium metal that escapes the moderate zone 18 in the lid of the process vessel then immediately comes into contact with cold zone 22. By integrating the moderate zone 18 with the lid of the process vessel 50 and placing the beginning of the cold zone 22 immediately above the process vessel 50, the distance in which the vacuum system 38 is required to lift the relatively heavy lithium vapors before they are condensed to liquid-phase lithium metal is decreased.

As shown in FIG. 5, the cold zone according to this embodiment is preferably in the form of a cooled conduit with an entry end and an exit end that is in fluid communication with the vacuum system 38 and process vessel 50. In preferred embodiments, the inner surface of the conduit is less than about 10° C. such that gaseous-phase lithium metal is condensed upon contact with the inner surface of the conduit. To prevent bridging of the condensed lithium metal and subsequent clogging of the conduit, the conduit is preferably at least four inches in diameter. While most gaseous-phase lithium metal will condense in either the moderate zone 18 or almost immediately upon entering the cold zone 22, the conduit preferably includes an extended length such that all gaseous-phase lithium metal is preferably condensed prior to being pulled out of cold zone 22 and into the vaccum system 38 and/or hydrogen storage compartment 114. A filter system may also be provided adjacent the exit end of the cold zone 22 to further prevent gaseous-phase lithium metal from being extracted into the vaccum system 38 and/or hydrogen storage compartment 114.

Another difference between apparatus 200 of FIG. 5 and apparatus 10 of FIG. 1 is that in FIG. 5 the center can 54 is elevated within the process vessel 50 (i.e., above the source material 58 and closer to the moderate zone 18). In this regard, because the moderate zone 18 is integrated into the lid of the process vessel 50, a temperature gradient may be provided in the process vessel with higher temperatures towards the bottom of the process vessel for vaporizing the lithium hydride source material 58 and cooler temperatures towards the top of the process vessel 50. In preferred embodiments, the bottom of hot zone 14 is heated to about 900° C. to about 1,000° C. to extract the gaseous-phase lithium metal as described above while the moderate zone 18 is cooled to about 300° C. to 450° C., or most preferably about 400° C. Allowing the lid to exceed a temperature of about 450° C. has been found to warp adjacent sealing surfaces, which makes the vessel 50 unusuable because it cannot hold the vaccum conditions described above. On the other hand, letting the lid stay in the 300° C. range results in a condensed liquid-phase lithium metal that is very viscous and does not flow well into the center can 54. Further, holding the lid to about 400° C. results in the center can 54 being heated at a relatively lower temperature of about 600° C., which prevents the condensed liquid-phase lithium metal collected in the center can from the cold zone 22 from reverting back to lithium vapor. Thus, this embodiment where the center can 54 is elevated within the process vessel may be used when the refined lithium is not intended to be recharged for repetitive operations.

In preferred embodiments, chilled copper coils are disposed adjacent the outside of the lid of the process vessel 50 to cool the moderate zone 18. Coiled heaters may also be disposed adjacent the outside of the lid of the process vessel to assist in keeping the temperature of the moderate zone 18 at the desired temperature. For example, assuming the chilled copper coils cool the moderate zone 18 to about 300° C., the coiled heaters may be used to bring the temperature of the moderate zone 18 up to the desired 400° C. Similarly, if the coiled heaters heat the moderate zone 18 to a temperature substantially above the 400° C., the chilled copper coils may be used to bring the temperature back down to about 400° C. Thus, the combination of a cooling source and a heating source may be used to maintain the moderate zone 18 at the desired temperature.

As also shown in FIG. 5, a reverse funnel shaped portion 132 is provided adjacent the end 162 of cylinder 158 to increase the surface area of the lid region of the process vessel 50 between the moderate zone 18 and the hot zone 14. By increasing the surface area underneath the moderate zone 18, the condensation rate is increased (i.e., the time required to collect the lithium vapor from the hot zone is reduced by increasing the surface area of the lid region of the process vessel leading to the cylinder 158).

In addition to various embodiments of apparatuses, the present disclosure provides methods of processing hydrogen and lithium material. The methods typically involve heating a lithium hydride source material that includes lithium hydride to form liquid-phase lithium hydride. The lithium hydride source material is heated to a temperature that is typically in the range of 750° C. to 800° C. to form a liquid-phase lithium hydride. A reduced ambient pressure over the liquid-phase lithium hydride (such as provided by a vacuum pump) extracts hydrogen and gaseous-phase lithium metal from the liquid-phase lithium hydride as the lithium hydride decomposes. The reduced ambient pressure also has a benefit of reducing the decomposition temperature of the lithium hydride. Typically the gaseous-phase lithium metal is condensed as solid-phase lithium metal. Sometimes a lithium condensate portion of the gaseous-phase lithium may be captured and returned to the lithium hydride source material as liquid-phase lithium condensate. The solid-phase lithium metal may be extracted from the cold zone by melting to form refined lithium metal, and the refined lithium metal may be hydrided using hydrogen gas to form a re-charged lithium hydride. The previously-described process steps for decomposing lithium hydride may then be repeated one or more times using recharged lithium hydride as the lithium material.

Some processes may involve retarding the formation of a barrier crust that may form adjacent the liquid-phase lithium hydride. This retarding step may involve sparging the liquid-phase lithium hydride with an inert gas such as argon, and/or it may involve agitating the liquid-phase lithium hydride with an energy having a periodic waveform, such as ultrasonic energy.

In summary, embodiments disclosed herein provide a hydrogen and lithium material processing apparatus and methods of processing hydrogen and lithium materials. The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A hydrogen, lithium, and lithium hydride processing apparatus comprising:
   a hot zone having a first heating source to heat a lithium hydride source material and decompose the lithium hydride source material to form gaseous-phase hydrogen and subsequently gaseous-phase lithium metal;
   a vacuum source to extract the gaseous-phase hydrogen and subsequently gaseous-phase lithium metal; and
   a cold zone to condense the gaseous-phase lithium metal as purified solid-phase lithium metal, the cold zone including a second heating source to melt the purified solid-phase lithium metal in the cold zone to form refined liquid-phase lithium metal.

2. The apparatus of claim 1 wherein the refined liquid-phase lithium metal is extracted back to the hot zone, the processing apparatus further comprising a source of hydrogen connected to the hot zone to hydride the refined liquid-phase lithium metal.

3. The apparatus of claim 1 further comprising a moderate zone disposed between the hot zone and the cold zone to capture a lithium condensate portion of the gaseous-phase lithium and to return the lithium condensate portion to the hot zone as liquid-phase lithium condensate.

4. The apparatus of claim 2 wherein the hot zone includes a process vessel for heating the solid-phase lithium hydride and collecting the refined liquid-phase lithium metal.

5. The apparatus of claim 4 further comprising a moderate zone disposed between the hot zone and the cold zone to return the refined liquid-phase lithium metal to the hot zone.

6. The apparatus of claim 5 wherein the moderate zone is integrated into a lid of the process vessel, the lid having a cylinder extending through the lid for directing the refined liquid-phase lithium metal to a collection can disposed in the process vessel.

7. The apparatus of claim 6 wherein the collection can is elevated within the process vessel to prevent the refined liquid-phase lithium metal from converting to gaseous-phase lithium metal.

8. The apparatus of claim 6 further comprising a reverse funnel-shaped portion disposed in the process vessel adjacent an entry end of the cylinder.

9. The apparatus of claim 1 wherein the apparatus comprises a filter to purify the gaseous-phase hydrogen extracted from the lithium hydride source material.

10. The apparatus of claim 1 further comprising an agitator to retard a formation of a barrier crust.

11. The apparatus of claim 10 wherein the agitator comprises an inert gas sparge to sparge liquid-phase lithium hydride formed in the hot zone.

12. The apparatus of claim 10 wherein the agitator comprises an energy source having a periodic waveform to agitate liquid-phase lithium hydride formed in the hot zone.

13. The apparatus of claim 1 wherein the cold zone comprises a counter flow gas to gas heat exchanger.

14. A hydrogen, lithium, and lithium hydride processing apparatus comprising:
   a process vessel including:
     a hot zone to heat a lithium hydride source material and decompose the lithium hydride source material to form gaseous-phase hydrogen and subsequently gaseous-phase lithium metal,
     a collection can disposed in the hot zone, and
     a lid disposed above the collection can, the lid forming a moderate zone to condense at least a portion of the gaseous-phase lithium metal to liquid-phase lithium metal and return the liquid-phase lithium metal to the collection can disposed in the hot zone;
   a cold zone in fluid communication with the process vessel to condense gaseous-phase lithium metal to solid-phase lithium metal from the gaseous-phase lithium metal that is not condensed to liquid-phase lithium metal in the moderate zone; and
   a vacuum source in fluid communication with the process vessel and cold zone to extract the gaseous-phase hydrogen and subsequently gaseous-phase lithium metal from the hot zone.

15. The apparatus of claim 14 wherein the moderate zone includes at least a cooling source for assisting in maintaining a desired temperature of the moderate zone.

16. The apparatus of claim 15 wherein the cooling source is disposed outside the process vessel adjacent the lid.

17. The apparatus of claim 14 wherein the moderate zone is held to a temperature between about 300° C. to about 450° C.

18. The apparatus of claim 14 wherein the moderate zone is held to a temperature of about 400° C.

19. The apparatus of claim 14 wherein the cold zone further comprises a heater to melt the purified solid-phase lithium metal in the cold zone to be collected in the collection can disposed in the hot zone.

20. The apparatus of claim 14 wherein the cold zone includes a conduit extending through the lid of the process vessel.

21. The apparatus of claim 20 further comprising a reverse funnel-shaped portion disposed in the process vessel adjacent an entry end of the conduit.

22. A hydrogen, lithium, and lithium hydride processing apparatus comprising:
   a process vessel including:
     a hot zone to heat a lithium hydride source material and decompose the lithium hydride source material to form gaseous-phase hydrogen and subsequently gaseous-phase lithium metal,
     a collection can disposed in the hot zone, and
     a lid disposed above the collection can, the lid forming a moderate zone to condense at least a portion of the gaseous-phase lithium metal to liquid-phase lithium metal and return the liquid-phase lithium metal to the collection can disposed in the hot zone;
   a cold zone in fluid communication with the process vessel to condense gaseous-phase lithium metal to solid-phase lithium metal from the gaseous-phase lithium metal that is not condensed to liquid-phase lithium metal in the moderate zone; and
   a vacuum source in fluid communication with the process vessel and cold zone to extract the gaseous-phase hydrogen and subsequently gaseous-phase lithium metal from the hot zone, wherein the collection can is positioned within the process vessel to prevent the liquid-phase lithium metal from converting to gaseous-phase lithium metal in the hot zone.

\* \* \* \* \*